(12) United States Patent
Wani et al.

(10) Patent No.: US 9,305,736 B2
(45) Date of Patent: Apr. 5, 2016

(54) PHOSPHOR FOR DISPERSION-TYPE EL, DISPERSION-TYPE EL DEVICE, AND METHOD OF MANUFACTURING THE SAME

(75) Inventors: Koichi Wani, Okayama (JP); Tatsuya Kanda, Okayama (JP); Emi Hashimoto, Okayama (JP); Kazushi Kawakami, Okayama (JP); Sadahiro Yagishita, Osaka (JP); Fumitaka Iwakura, Osaka (JP); Taku Nishikawa, Osaka (JP)

(73) Assignee: TAZMO CO., LTD., Okayama (JP)

( * ) Notice: Subject to any disclaimer, the term of this patent is extended or adjusted under 35 U.S.C. 154(b) by 184 days.

(21) Appl. No.: 14/131,754

(22) PCT Filed: Jul. 11, 2012

(86) PCT No.: PCT/JP2012/067682
§ 371 (c)(1),
(2), (4) Date: Jan. 9, 2014

(87) PCT Pub. No.: WO2013/011889
PCT Pub. Date: Jan. 24, 2013

(65) Prior Publication Data
US 2014/0138590 A1 May 22, 2014

(30) Foreign Application Priority Data

Jul. 15, 2011 (JP) ................. 2011-156309

(51) Int. Cl.
| | |
|---|---|
| *C09K 11/00* | (2006.01) |
| *C09K 11/08* | (2006.01) |
| *C09K 11/56* | (2006.01) |
| *H05B 33/10* | (2006.01) |
| *H05B 33/14* | (2006.01) |
| *H01J 7/02* | (2006.01) |
| *C09K 11/64* | (2006.01) |
| *C09K 11/58* | (2006.01) |
| *C09K 11/61* | (2006.01) |
| *B29C 43/00* | (2006.01) |
| *B29C 43/52* | (2006.01) |

(52) U.S. Cl.
CPC ................. *H01J 7/02* (2013.01); *B29C 43/003* (2013.01); *B29C 43/52* (2013.01); *C09K 11/584* (2013.01); *C09K 11/612* (2013.01); *C09K 11/642* (2013.01)

(58) Field of Classification Search
CPC .. C09K 11/642; C09K 11/612; C09K 11/584; B29C 43/52; B29C 43/003
See application file for complete search history.

(56) References Cited

U.S. PATENT DOCUMENTS 4,140,940 A * 2/1979 Uehara ................ C09K 11/642
252/301.4 R

FOREIGN PATENT DOCUMENTS

| GB | 1476396 | * | 6/1977 |
| JP | 64-18117 B | | 1/1989 |

(Continued)

OTHER PUBLICATIONS

International Search Report for corresponding International Application No. PCT/JP2012/067682 mailed Sep. 18, 2012.

*Primary Examiner* — Carol M Koslow
(74) *Attorney, Agent, or Firm* — Renner, Otto, Boisselle & Sklar, LLP

(57) ABSTRACT

Provided is a phosphor for a dispersion-type EL that may be manufactured in a simple process and may provide stable, high brightness and light emission efficiency. The phosphor for a dispersion-type EL according to the present invention includes a mixture of an electron-accepting phosphor particle (4A) and an electron-donating phosphor particle (4B). The electron-accepting phosphor particle (4A) includes a base particle and an acceptor element added thereto, and the electron-donating phosphor particle (4B) includes a base particle and a donor element added thereto. For example, the base particle is a ZnS particle, the acceptor element is Cu, and the donor element is Cl or Al.

11 Claims, 7 Drawing Sheets

(56) References Cited

FOREIGN PATENT DOCUMENTS

| JP | 2002-226847 A | 8/2002 |
| JP | 2005-132947 A | 5/2005 |
| JP | 2006-306905 A | 11/2006 |
| JP | 2007-144304 A | 6/2007 |
| JP | 2008-214461 A | 9/2008 |
| JP | 2009-144073 A | 7/2009 |
| JP | 2011-111477 A | 6/2011 |
| KR | 20020020309 * | 3/2002 |
| WO | WO 2008-032737 A1 | 3/2008 |
| WO | WO 2008/069174 A1 | 6/2008 |

* cited by examiner

PHOSPHOR FOR DISPERSION-TYPE EL, DISPERSION-TYPE EL DEVICE, AND METHOD OF MANUFACTURING THE SAME

TECHNICAL FIELD

The present invention relates to a phosphor for a dispersion-type electroluminescence (hereinafter referred to as a dispersion-type EL), a dispersion-type EL device including the phosphor, and a method of manufacturing the same.

BACKGROUND ART

A known phosphor for a dispersion-type EL is ZnS that is added with an activator such as Cu, Ag or a co-activator such as Cl, I, or Al. This type of phosphors emits large amount of light by ultraviolet light excitation and electron beam excitation and is also used as a phosphor for CRT. For the light emission from the dispersion-type EL, electrons should be efficiently injected by an electric field. It is understood that in the ZnS phosphor for the dispersion-type EL, $Cu_2S$ (cuprous sulfide) is precipitated in stacking faults in the ZnS crystal, and an electric field discharges electrons $e^-$ or holes h from the electrically conductive $Cu_2S$, which provide the light emission from the ZnS phosphor body.

For the sufficient precipitation of $Cu_2S$ in the ZnS particles, a certain size of particles are necessary. Practically, a phosphor is made available that has an average particle size of about 30 μm. This large particle size of the phosphor causes the light emitting layer to have a film thickness of at least 30 μm or more, which increases the operating voltage. In addition, the light emission inside the phosphor particle is absorbed before it is discharged outside, thereby providing insufficient brightness. Particle size reduction to solve the above problems does not provide sufficient stacking faults where the $Cu_2S$ is precipitated, thereby reducing the brightness. Therefore, various proposals have been conventionally made.

For example, patent literature 1 proposes formation of a layer on the surface of the ZnS phosphor of an ultrafine particle, the layer being of different conductivity type from the phosphor. Specifically, for example, when the base is of p-type, a layer of n-type is formed on the surface, and when the base is of n-type, a layer of p-type is formed on the surface. This proposal focuses attention on the fact that $Cu_2S$ is a p-type semiconductor, and intends to add a similar function on the phosphor surface instead of precipitating $Cu_2S$. However, the change of the conductive type of the phosphor surface needs diffusion of dopants under a high temperature or the like. This suffers from the loss of the performance of the phosphor body and less brightness.

Patent literature 2 proposes a configuration in which a $Cu_2S$ layer is formed on the ZnS phosphor surface as shown in FIG. 7. Although patent literature 2 has the same concept as the patent literature 1, literature 2 is different from the literature 1 in that it uses $Cu_2S$ that can be easily generated from the Cu-added ZnS phosphor. Because, however, the phosphor surface is covered by electrically conductive $Cu_2S$, a leak current increases the power consumption, thus reducing the light emission efficiency.

CITATION LIST

Patent Literature

[Patent Literature 1] Japanese Patent Publication No. 1-18117
[Patent Literature 2] Japanese Patent Unexamined Publication No. 2009-144073

SUMMARY OF INVENTION

Technical Problem

To solve the above technical problems, the present invention aims to provide a phosphor for a dispersion-type EL that may be manufactured in a simple process and may provide stable, high brightness and light emission efficiency.

Solution to Problem

A phosphor for a dispersion-type EL according to the present invention includes a mixture of two types of phosphor particles: an electron-accepting phosphor particle; and an electron-donating phosphor particle. The inventors have reached the present invention by finding that the mixture phosphor for the dispersion-type EL exhibits excellent light emitting properties that may not be obtained by each phosphor alone. More particularly, the phosphor for the dispersion-type EL according to the present invention only requires the manufacture of the electron-accepting and electron-donating phosphor particles of uniform composition. This may provide a stable manufacturing process, which facilitates the mass production and contributes to the cost reduction.

Preferably, the electron-accepting phosphor particle includes a base particle and an acceptor element added thereto. Note that as long as it is electron-accepting, the phosphor particle may include a base particle and donor and acceptor elements added thereto in a ratio that the acceptor element is rich.

Preferably, the electron-donating phosphor particle includes a base particle and a donor element added thereto. Note that as long as it is electron-donating, the phosphor particle may include a base particle and donor and acceptor elements added thereto in a ratio that the donor element is rich.

As specific examples, the base particle is a ZnS particle, the acceptor element is Cu, and the donor element is Cl or Al. Cu replaces Zn of the ZnS particle. Cl and Al replace S and Zn of the ZnS particle, respectively.

Each of the electron-accepting and electron-donating phosphor particles has a particle size of 15 μm or less. Preferably, such a fine particle phosphor is made by solution phase synthesis. Because the solution phase synthesis grows a crystal from the single atom level, it provides a fine particle phosphor having good crystallinity.

Although it is ideal that the electron-accepting and electron-donating phosphor particles are mixed in the ratio of 1:1 (by weight), the present invention is not limited thereto. For example, the mixing ratio may be varied in the range of 1:3 to 3:1.

It is preferable that the electron-accepting and electron-donating phosphor particles are in contact with each other. Thus, preferably, each phosphor particle is provided in a powder state and mixed, and then fired at a high temperature (a temperature not disturbing the phosphor composition), pressed, or in particular, pressed at a high temperature.

In addition, a dispersion-type EL device according to the present invention includes a light emitting layer, the light emitting layer including a binder resin and the phosphor for a dispersion-type EL dispersed therein.

It is preferable that the electron-accepting and electron-donating phosphor particles are contact with each other in the light emitting layer. Thus, preferably, the phosphor for a dispersion-type EL and the binder resin are mixed in the weight ratio of 2:1 or more. In addition, after the light emitting layer is formed, it may be pressed at a high temperature to facilitate the contact between the particles.

Advantageous Effects of Invention

The present invention may provide a phosphor for a dispersion-type EL that may be manufactured in a simple process and may provide stable, high brightness and light emission efficiency.

DESCRIPTION OF EMBODIMENTS

Figure 1:
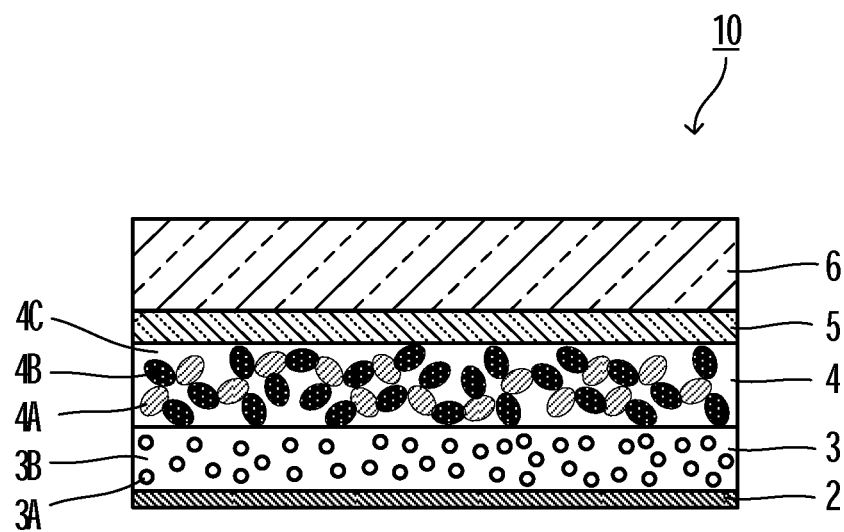
FIG. 1 is a cross-sectional view of a dispersion-type EL device according to an embodiment of the present invention.

With reference to FIG. 1, a schematic configuration of a dispersion-type EL device according to an embodiment of the present invention will be described. FIG. 1 shows a dispersion-type EL device 10 according to the embodiment. The dispersion-type EL device 10 includes a transparent film 6 having a transparent electrode 5 formed thereon. The transparent electrode 5 bears a stack of a light emitting layer 4, a dielectric layer 3, and a backside electrode 2 in this order. FIG. 1 shows the components in the reverse direction with respect to the stacking direction so that the light emitting surface faces upward.

The transparent film 6 may be any resin film that has low moisture permeability and hygroscopicity. Preferably, the transparent film 6 may be a thermal resistant resin film such as polyethylene terephthalate that has good thermal resistance. The film thickness is preferably 0.30 mm or less for improved flexibility of the surface light emitting element.

The transparent electrode 5 is a transparent conductor such as ITO that is formed on the transparent film 6 by, for example, sputter deposition.

The light emitting layer 4 includes a binder 4C of thermoplastic resin having two types of phosphor particles 4A and 4B uniformly dispersed therein. The present invention is characterized in that, as described below, the two types of phosphor particles 4A and 4B in the light emitting layer 4 have different conductivity types (p-type or n-type).

The binder 4C may be formed of the same material as a binder 3B in the dielectric layer 3.

In addition, the first phosphor particle 4A includes an electron-accepting phosphor. In the present invention, the electron-accepting phosphor means a phosphor exhibiting the nature of p-type semiconductor in which the majority carrier is holes h. The electron-accepting phosphor is referred hereinafter to as a "p-type phosphor". Preferably, the p-type phosphor particle 4A may include a ZnS particle as the base material having an acceptor element such as Cu or Ag added therein. Note that as long as the majority carrier is holes h, an infinitesimal amount of donor element may be included.

In addition, the second phosphor particle 4B includes an electron-donating phosphor. In the present invention, the electron-donating phosphor means a phosphor exhibiting the nature of n-type semiconductor in which the majority carrier is electrons. the electron-donating phosphor is referred hereinafter to as an "n-type phosphor". Preferably, the n-type phosphor particle 4B may include a ZnS particle as the base material having a donor element such as Cl, I, Br, or Al added thereto. Note that as long as the majority carrier is electrons, an infinitesimal amount of acceptor element may be included.

It is preferable that the p-type phosphor particle 4A and the n-type phosphor particle 4B are contact with each other. Thus, preferably, the weight ratio of the total phosphor amount and the resin amount in the light emitting layer 3 is 2:1 or more. In addition, after the light emitting layer 3 is formed, it may be pressed at a high temperature to facilitate the contact between the p-type and n-type phosphor particles 4A and 4B. Moreover, the p-type phosphor particle 4A and the n-type phosphor particle 4B may be mixed in a powder state, and then fired at a high temperature that does not disturb the phosphor composition, or pressed at a high temperature or the like, and then mixed with the binder resin.

Although it is ideal that the p-type phosphor particle 4A and the n-type phosphor particle 4B are mixed in the ratio of 1:1 (by weight), the present invention is not limited thereto. For example, the mixing ratio may be varied in the range of 1:3 to 3:1.

The p-type and n-type phosphor particles 4A and 4B have a particle size of 15 μm or less. Preferably, such a fine particle phosphor is made by solution phase synthesis. Because the solution phase synthesis grows a crystal from the single atom level, it provides a fine particle phosphor having good crystallinity. In contrast, in the solid phase method, a crystal grown under a high temperature is ground to the desired particle size. Thus, the finer the particle is, the more the defects are, thereby reducing the performance as the phosphor.

The light emitting layer 4 is formed as follows. The p-type phosphor particle 4A and the n-type phosphor particle 4B are mixed in the binder 4C to form a phosphor paste. The phosphor paste is applied on the transparent electrode 5 in a uniform thickness by, for example, a screen printing or the like, and is then fired.

The dielectric layer 3 includes the binder 3B of a thermoplastic resin and a dielectric material particle 3A uniformly dispersed therein.

The material of the binder 3B includes a thermoplastic resin such as a fluororubber-based resin, a fluorine-based resin, an acrylic-based resin, a polypropylene-based resin, a polystyrene-based resin, a polyvinyl chloride, or other resin materials softened by heat.

The material of the dielectric material particle 3A preferably includes a fine particle of $BaTiO_3$ (barium titanate) or rutile type $TiO_2$ (titanium dioxide).

The dielectric layer 3 is formed as follows. The binder 3B is dissolved in a solvent. The dielectric material particle 3A is dispersed and mixed in the solvent to form a dielectric paste. The dielectric paste is applied on the light emitting layer 4 in a uniform thickness by, for example, a screen printing or the like, and is then fired.

The backside electrode 2 is, for example, a conductive metal material such as aluminum that is formed on the dielectric material 3 by vacuum deposition. The backside electrode 2 may also be a conductive paste such as a silver paste that is screen printed on the dielectric material 3.

Although there are several theories, it is generally believed that the light emitting mechanism of the dispersion-type EL device is the so-called D-A pair-type light emission that uses photons emitted when electrons $e^-$ at the donor levels recombine with holes h at the acceptor levels. Therefore, the electrons $e^-$ should be provided to the donor levels by providing the electrons $e^-$ to the conductive band, and the holes h should be provided to the acceptor levels by providing the holes h to the valence bands. The simplest and most effective mechanism therefor is to form a pn-junction and inject to the junction portion the holes h from the p-type semiconductor and the electrons $e^-$ from the n-type semiconductor.

Figure 6:
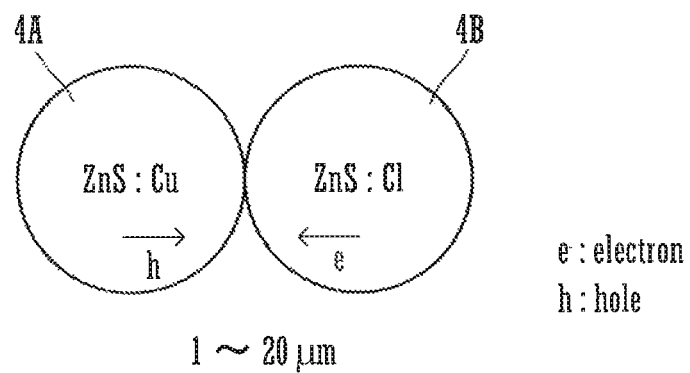
FIG. 6 is a schematic diagram illustrating the light emitting mechanism of the phosphor for a dispersion-type EL according to the present invention.
Figure 7:
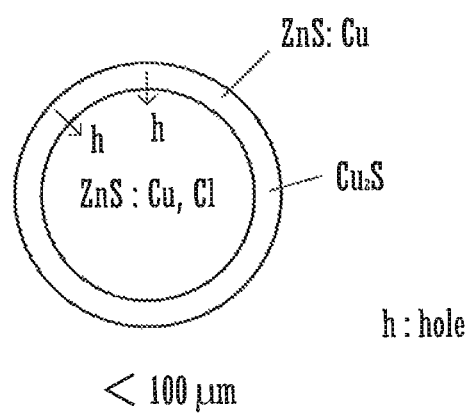
FIG. 7 is a schematic diagram illustrating a different light emitting mechanism of a conventional phosphor for a dispersion-type EL.

In the light emitting layer 4 of the dispersion-type EL device 10 of the present invention, the p-type phosphor particle 3A and the n-type phosphor particle 3B are only mixed. It is thus difficult to think that the perfect pn-junction is formed therebetween. Because, however, the phosphor particle is ground into fine particles, a large number of contact portions are formed between the p-type phosphor particle 3A and the n-type phosphor particle 3B as shown in FIG. 6. It is thus expected to have an effect similar to that provided when the junction is formed. Therefore, a phosphor having no $Cu_2S$ precipitation may also provide sufficient light emission intensity. In addition, the precipitation condition of $Cu_2S$ is dominated by accidentalness in that during the manufacturing process of the phosphor, stacking faults are formed and an optimum amount of $Cu_2S$ is precipitated therein. It is thus difficult to control the process, thus providing a low yield. For the phosphor of the present invention, it is only required to manufacture p-type and n-type phosphor particles of uniform composition. This may provide a stable manufacturing process, which facilitates the mass production and contributes to the cost reduction.

Examples of the dispersion-type EL devices according to the embodiments will be provided below to clear the effects of the present invention.

<Fabrication of P-Type Phosphor Particles>

P-type phosphor particles were created by solution phase synthesis as described below. An aqueous sodium sulfide solution (ammonium sulfide or hydrogen sulfide may also be used) is added with an aqueous solution of water soluble copper compound such as copper chloride (copper sulphate or copper nitrate may also be used). A water solution of water soluble zinc compound such as zinc chloride is then added. After adjustment with acid or alkali for the appropriate pH, the solution is aged for hours. After aging, the precipitate is filtered and cleaned with deionized water. The precipitate filtered during the solution phase synthesis is dried and then fired in a nitrogen atmosphere or is directly fired in the nitrogen atmosphere. Thus, a ZnS fine crystal is obtained having a particle size (D50) of about 10 μm and containing Cu as an activator (acceptor element). Table 1 shows the compositions of two types of p-type phosphor particles P1 and P2 thus obtained. P1 is a sample added with almost only a Cu activator. A small amount of Cu is replaced by Zn, thus exhibiting p-type. P2 is added with more Cu than P1 to exhibit stronger p-type than P1.

TABLE 1

| P-Type Phosphor Particle | Base Material | Activator | Co-Activator mol % |
|---|---|---|---|
| P1 | ZnS | Cu 0.071 | N.D.* |
| P2 | ZnS | Cu 0.121 | N.D. |

*Not Detected

<Fabrication of N-Type Phosphor Particles>

Using almost the same technique as the above solution phase synthesis and a different firing condition, n-type phosphor particles having more co-activator (donor element) are fabricated. Note that at least one of the copper compound and the zinc compound that are added in aqueous solution form is chloride. Table 2 shows the compositions of three types of n-type phosphor particles N1 to N3 thus obtained. N1 and N2 are samples containing Cl as a co-activator. A small amount of Cl is replaced by S, thus providing n-type. N3 is a sample that is obtained by further addition of an aqueous solution of water soluble aluminum compound such as aluminum chloride during the solution phase synthesis before firing. N3 includes Cl as well as Al as the co-activator. Note that Al is replaced by Zn, thus exhibiting n-type.

TABLE 2

| N-Type Phosphor Particle | Base Material | Activator | Co-Activator mol % |
|---|---|---|---|
| N1 | ZnS | Cu 0.064 | Cl 1.68 |
| N2 | ZnS | Cu 0.071 | Cl 1.57 |
| N3 | ZnS | N.D. | Cl 0.58, Al 0.28 |

<Configuration of Dispersion-Type El Device>

Example 1

A transparent electrode film (the transparent electrode 5) of ITO (indium oxide) was formed on one side of a PET film (the transparent film 6). The light emitting layer 4 was formed on the ITO transparent electrode film side. The light emitting layer 4 was formed as follows. The phosphors P1 and N1 were mixed in 1:1 (by weight). The mixture was mixed with a binder resin in the weight ratio of 3:1 to form a phosphor paste. The phosphor paste was applied on the transparent electrode 5 and fired to provide a film thickness of about 60 μm. The dielectric layer 3 was formed as follows. The barium titanate particles and the fluorine-based resin were mixed in the weight ratio of 3:1 to form a dielectric paste. The dielectric paste was applied on the light emitting layer 4 and fired to provided a film thickness of 20 μm. Finally, Ag paste was applied on the dielectric material 3 and fired to form the backside electrode 2. The dispersion-type EL device in example 1 was thus manufactured.

Comparative Example 1

The dispersion-type EL device in comparative example 1 was different from the dispersion-type EL device in example 1 in that the phosphor in the light emitting layer 4 included only the p-type phosphor P1. The other configuration was the same as that of the dispersion-type EL device in example 1.

Comparative Example 2

The dispersion-type EL device in comparative example 2 was different from the dispersion-type EL device in example 1 in that the phosphor in the light emitting layer 4 included only the n-type phosphor N1. The other configuration was the same as that of the dispersion-type EL device in example 1.

Example 2

The dispersion-type EL device in example 2 was different from the dispersion-type EL device in example 1 in that the combination of the p-type and n-type phosphors in the light emitting layer 4 was P2 and N2, the mixing rate of the phosphor to the binder resin was increased, and the film thickness of the light emitting layer 4 was decreased. Specifically, the light emitting layer 4 was formed as follows. The phosphors P2 and N2 were mixed in the ratio of 1:1 (by weight). The mixture was mixed with a binder resin in the weight ratio 5:1 to form a phosphor paste. The phosphor paste was applied on the transparent electrode 5 and fired to provide a film thickness of 30 μm. The other configuration was the same as that of the dispersion-type EL device in example 1.

Comparative Example 3

The dispersion-type EL device in comparative example 3 was different from the dispersion-type EL device in example 2 in that the phosphor in the light emitting layer 4 included only the p-type phosphor P2. The other configuration was the same as that of the dispersion-type EL device in example 2.

Comparative Example 4

The dispersion-type EL device in comparative example 4 was different from the dispersion-type EL device in example 2 in that the phosphor in the light emitting layer 4 included only the n-type phosphor N2. The other configuration was the same as that of the dispersion-type EL device in example 2. The other configuration was the same as that of the dispersion-type EL device in example 2.

Comparative Example 5

The dispersion-type EL device in comparative example 5 was different from the dispersion-type EL device in example 2 in that the phosphor in the light emitting layer 4 included a mixture of the p-type phosphors P1 and P2 in the ratio of 1:1 (by weight).

Example 3

The dispersion-type EL device in example 3 was different from the dispersion-type EL device in example 2 in that the combination of the p-type and n-type phosphors in the light emitting layer 4 was P2 and N3. Specifically, The light emitting layer 4 was formed as follows. The phosphor P2 and N3 were mixed in 1:1 (by weight). The mixture was mixed with a binder resin in the weight ratio of 5:1 to form a phosphor paste. The phosphor paste was applied on the transparent electrode 5 and fired to provide a film thickness of 30 μm. The other configuration was the same as that of the dispersion-type EL device in example 2.

Comparative Example 6

The dispersion-type EL device in comparative example 6 was different from the dispersion-type EL device in example 3 in that the phosphor in the light emitting layer 4 included only the n-type phosphor N3. The other configuration was the same as that of the dispersion-type EL device in example 3.

Example 4

The dispersion-type EL device in example 4 was different from the dispersion-type EL device in example 2 in that in the process of forming the light emitting layer 4, the phosphor paste was applied, fired, and followed by an additional process in which the light emitting layer 4 was pressed at a pressure of 0.5 MPa while it was heated at 120° C. The other configuration was the same as that of the dispersion-type EL device in example 2.

Example 5

The dispersion-type EL device in example 5 was different from the dispersion-type EL device in example 4 in that in the process of forming the light emitting layer 4, the heating temperature and the press pressure were increased. Specifically, in the process of forming the light emitting layer 4, the phosphor paste was applied, fired, and followed by an additional process in which the light emitting layer 4 was pressed at a pressure of 15 MPa while it was heated at 130° C. The other configuration was the same as that of the dispersion-type EL device in example 4.

Table 3 summarizes the above description and compares the phosphors used in the dispersion-type EL devices in examples 1 to 3 and comparative examples 1 to 6. Table 3 also shows the figures to be referred to in the testing as described below.

TABLE 3

Figure 2:
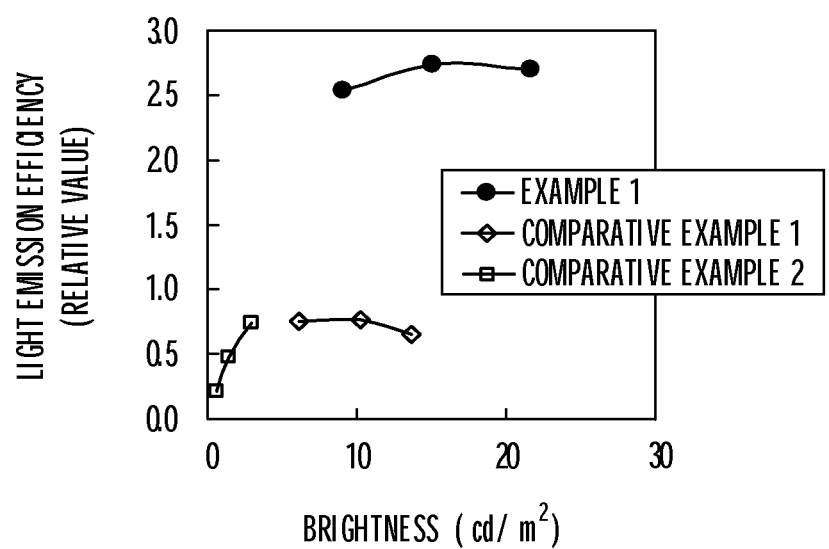
FIG. 2 illustrates an example light emitting property of a dispersion-type EL device in an example and light emitting properties of dispersion-type EL devices in comparative examples.
Figure 3:
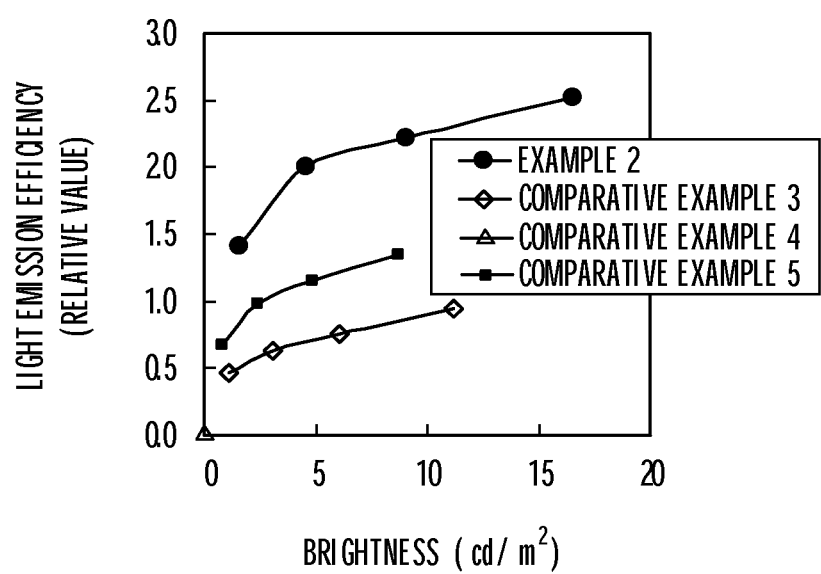
FIG. 3 illustrates another example light emitting property of a dispersion-type EL device in an example and light emitting properties of dispersion-type EL devices in comparative examples.
Figure 4:
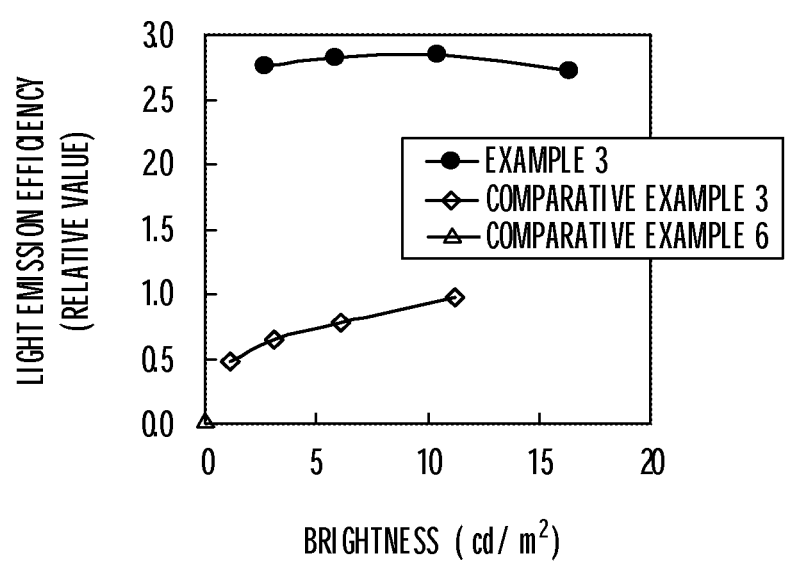
FIG. 4 illustrates still another example light emitting property of a dispersion-type EL device in an example and light emitting properties of dispersion-type EL devices in comparative examples.
Figure 5:
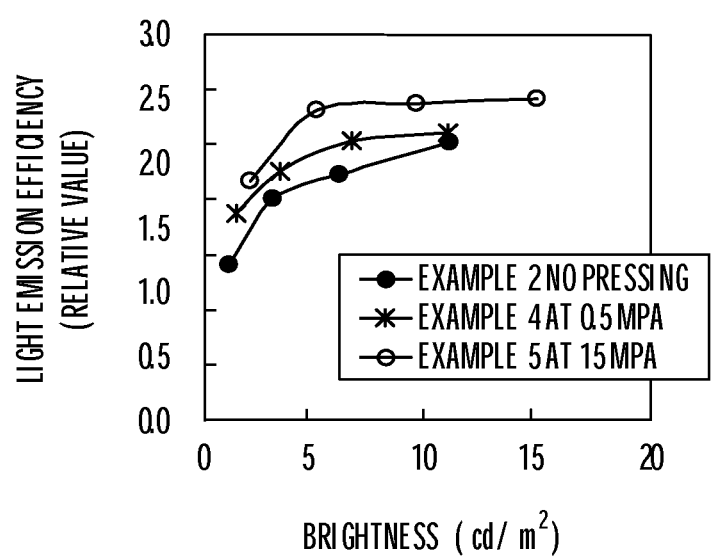
FIG. 5 illustrates example light emitting properties of a dispersion-type EL device in examples that include an additional process of pressing the light emitting layer.

| Dispersion-Type EL Device | Phosphor | Light Emitting Layer Film Thickness | Phosphor/Binder Resin | Reference FIGS. |
|---|---|---|---|---|
| Example 1 | P1 + N1 | 60 μm | 3:1 | FIG. 2 |
| Comparative Example 1 | P1 | 60 μm | 3:1 | |
| Comparative Example 2 | N1 | 60 μm | 3:1 | |
| Example 2 | P2 + N2 | 30 μm | 5:1 | FIG. 3   FIG. 5 |
| Comparative Example 3 | P2 | 30 μm | 5:1 | FIG. 4 |
| Comparative Example 4 | N2 | 30 μm | 5:1 | |
| Comparative Example 5 | P1 + P2 | 30 μm | 5:1 | |
| Example 3 | P2 + N3 | 30 μm | 5:1 | |
| Comparative Example 6 | N3 | 30 μm | 5:1 | FIG. 4 |
| Example 4 | P2 + N2*[1] | 30 μm | 5:1 | FIG. 5 |
| Example 5 | P2 + N2*[2] | 30 μm | 5:1 | |

*[1] The light emitting layer was pressed (at 120° C. and 0.5 MPa).
*[2] The light emitting layer was pressed (at 130° C. and 15 MPa).

<Light Emitting Property Test>

FIG. 2 shows the light emitting properties of example 1 as well as comparative examples 1 and 2 with the x-axis showing the light emission brightness and the y-axis showing the relative emission efficiency (the ratio of brightness/electric power). The measurement was done by driving a dispersion-type EL devices with a sine wave of 10 kHz frequency and an effective value voltage of 175 to 250 V. In example 1 where the p-type phosphor P1 and the n-type phosphor N1 were mixed, the brightness was improved by two times or more and the light emission efficiency was improved by three times or more compared to comparative example 1 and 2 where the P1 and N1 were used alone, respectively. This shows that the mixture of two types of phosphors P1 and N1 provides an effect that is not obtained by each phosphor alone. As a result, the brightness was improved as well as the light emission efficiency was increased, thereby largely reducing the power consumption.

FIG. 3 shows the light emitting properties of the dispersion-type EL devices in example 2 and comparative examples 3 to 5. The measurement was done by driving a dispersion-type EL devices with a sine wave of 10 kHz frequency and an effective value voltage 100 to 215V. In example 2 where the p-type phosphor P2 and the n-type phosphor N2 were mixed, the brightness was improved by about 1.5 times and the light emission efficiency was improved by about 2.5 times compared to comparative example 3 where the P2 was used alone. Note that comparative example 4 where the N2 was used alone showed little light emission. Meanwhile, in comparative example 5 where the p-type phosphors P1 and P2 were mixed, the brightness was decreased by about 20% and the light emission efficiency was increased only by about 1.3 times. This may be because the P1 and P2 were of the same conductivity type (p-type) although they had different Cu concentrations. This shows that the mixture of the phosphors of different conductivity types (p-type and n-type) in the examples largely contributes to the improved performance. Compared to example 1 where the light emitting layer has a larger film thickness, example 2 shows the start of the light emission at a low voltage of about 100V. This shows the effect of grinding the phosphor into fine particles.

FIG. 4 shows the light emitting properties of the dispersion-type EL devices in example 3 and comparative examples 3 and 6. The EL devices were driven in the same condition as in FIG. 3. In example 3 where the p-type phosphor P2 and the n-type phosphor N3 were mixed, the light emission efficiency was increased by about 2.5 and the brightness was increased compared to comparative example 3 where the P2 was used alone. Note that comparative example 6 where the N2 was used alone showed little light emission. This shows that the mixture of two types of phosphors P2 and N3 provides an effect that is not obtained by each phosphor alone. It is also shown that the effect is not limited by the type of the element.

FIG. 5 shows the light emitting properties of the dispersion-type EL devices in examples 2, 4, and 5. The EL devices were driven in the same condition as in FIG. 3. The dispersion-type EL devices in examples 4 and 5 tend to improve in brightness and light emission efficiency against that in example 2. This shows that pressing the light emitting layer increases the degree of contact between the two types of phosphors P2 and N2, thereby improving the performance.

The described embodiments are to be considered in all respects as illustrative and not restrictive. It should be appreciated that the scope of the invention is not limited to the described embodiments, but rather is defined by the appended claims. All changes that come within the meaning and scope of the appended claims and any equivalents thereof are intended to be embraced within the scope of the invention.

REFERENCE SIGNS LIST

2: BACKSIDE ELECTRODE
3: DIELECTRIC LAYER
4: LIGHT EMITTING LAYER
4A: P-TYPE PHOSPHOR PARTICLE (ELECTRON-ACCEPTING PHOSPHOR PARTICLE)
4B: N-TYPE PHOSPHOR PARTICLE (ELECTRON-DONATING PHOSPHOR PARTICLE)
5: TRANSPARENT ELECTRODE
6: TRANSPARENT FILM
10: DISPERSION-TYPE EL DEVICE

The invention claimed is:

1. A phosphor for a dispersion-type EL, the phosphor comprising a mixture of an electron-accepting phosphor particle and an electron-donating phosphor particle, wherein
   the electron-accepting phosphor particle comprises a base particle, and donor and acceptor elements added thereto in a ratio that the acceptor element is rich, and the electron-donating phosphor particle comprises a base particle, and donor and acceptor elements added thereto in a ratio that the donor element is rich, and
   the base particle is a ZnS particle, the acceptor element is Cu, and the donor element is Cl or Al.

2. The phosphor for a dispersion-type EL according to claim 1, wherein
   the electron-accepting phosphor and the electron-donating phosphor are made by solution phase synthesis.

3. The phosphor for a dispersion-type EL according to claim 1, wherein
   the electron-accepting phosphor and the electron-donating phosphor are mixed in a weight ratio of 3:1 to 1:3.

4. The phosphor for a dispersion-type EL according to claim 2, wherein
   the electron-accepting phosphor and the electron-donating phosphor are mixed in a weight ratio of 3:1 to 1:3.

5. A method of manufacturing the phosphor for a dispersion-type EL according to claim 1, comprising the steps of:
   mixing an electron-accepting phosphor and an electron-donating phosphor; and
   pressing the mixture.

6. A method of manufacturing the phosphor for a dispersion-type EL according to claim 1, comprising the steps of:
   mixing an electron-accepting phosphor and an electron-donating phosphor; and
   pressing the mixture under a heated condition.

7. A method of manufacturing the phosphor for a dispersion-type EL according to claim 1, comprising the steps of:
   mixing an electron-accepting phosphor and an electron-donating phosphor; and
   firing the mixture at a high temperature.

8. A dispersion-type EL device comprising a light emitting layer, the light emitting layer comprising a binder resin and the phosphor for a dispersion-type EL according to claim 1 dispersed therein.

9. The dispersion-type EL device according to claim 8, wherein
   the phosphor for a dispersion-type EL and the binder resin are mixed in a weight ratio of 2:1 or more.

10. A method of manufacturing the dispersion-type EL device according to claim 8, comprising the steps of:
    applying a phosphor paste, the phosphor paste comprising a binder resin and a phosphor dispersed therein;
    firing the phosphor paste; and
    pressing the phosphor paste at a high temperature.

11. A method of manufacturing the dispersion-type EL device according to claim 9, comprising the steps of:
applying a phosphor paste, the phosphor paste comprising a binder resin and a phosphor dispersed therein;
firing the phosphor paste; and
pressing the phosphor paste at a high temperature.

* * * * *